US008179307B2

(12) United States Patent  (10) Patent No.: US 8,179,307 B2
De Gramont et al.  (45) Date of Patent: May 15, 2012

(54) METHOD FOR THE MULTIPATH PASSIVE RADAR PROCESSING OF AN FM OPPORTUNITY SIGNAL

(75) Inventors: Emmanuel De Gramont, Paris (FR); Guy Desodt, Massy (FR); Sébastien Allam, Antony (FR)

(73) Assignee: Thales, Neuilly sur Seine (FR)

( * ) Notice: Subject to any disclaimer, the term of this patent is extended or adjusted under 35 U.S.C. 154(b) by 280 days.

(21) Appl. No.: 12/519,064

(22) PCT Filed: Dec. 12, 2007

(86) PCT No.: PCT/EP2007/063830
§ 371 (c)(1),
(2), (4) Date: Sep. 9, 2009

(87) PCT Pub. No.: WO2008/071745
PCT Pub. Date: Jun. 19, 2008

(65) Prior Publication Data
US 2010/0085243 A1    Apr. 8, 2010

(30) Foreign Application Priority Data
Dec. 12, 2006 (FR) ..................... 06 10811

(51) Int. Cl.
*G01S 7/35* (2006.01)
*G01S 13/32* (2006.01)
*G01S 7/02* (2006.01)
*G01S 13/00* (2006.01)

(52) U.S. Cl. .......... 342/195; 342/89; 342/118; 342/128; 342/159; 342/175; 342/350; 342/351

(58) Field of Classification Search ........... 342/82–103, 342/118, 128–133, 159, 175, 192–197, 350, 342/351, 59
See application file for complete search history.

(56) References Cited

U.S. PATENT DOCUMENTS
4,024,540 A * 5/1977 Ofverberg .................. 342/128

FOREIGN PATENT DOCUMENTS
FR    2882442 A1    8/2006
GB    2232318 A  * 12/1990
WO    WO-02/091010 A    11/2002

OTHER PUBLICATIONS

Morabito, et al. "Improved computational performance for distributed passive radar processing through channelised data—Passive radar systems" IEE Proceedings: Radar, Sonar & Navigation, Institution of Electrical Engineers, GB, vol. 152, No. 3, Jun. 3, 2005, pp. 179-184.

(Continued)

*Primary Examiner* — Bernarr Gregory
(74) *Attorney, Agent, or Firm* — Stroock & Stroock & Lavan LLP

(57) ABSTRACT

A signal processing method performs operations of coherent processing making it possible notably to purge the useful signal of the spurious signals (in particular the reference signal and its multiple reflections), to regenerate the transmission signal and to perform a coherent integration of the signal received by computing the cross-ambiguity between the signal received and the regenerated transmission signal. It also performs operations of non-coherent processing making it possible in particular to carry out extraction and Doppler distance purification operations making it possible to form blips and to eliminate the spurious blips present among the blips formed. The method applies notably to passive radars operating on non-cooperating opportunity transmissions, such as FM transmissions intended for the public.

6 Claims, 8 Drawing Sheets

OTHER PUBLICATIONS

Howland, et al. "FM radio based bistatic radar—Passive radar systems" IEE Proceedings: Radar, Sonar & Navigation, Institution of Electrical Engineers, GB, vol. 152, No. 3, Jun. 3, 2005, pp. 107-115.

Kubica, et al. "Optimum Target Detection using Illuminators of Opportunity" Apr. 2006. Radar, 2006 IEEE Conference on Apr. 2006, Piscataway, NJ, USA, IEEE, p. 417-424.

* cited by examiner

METHOD FOR THE MULTIPATH PASSIVE RADAR PROCESSING OF AN FM OPPORTUNITY SIGNAL

CROSS-REFERENCE TO PRIOR APPLICATION

This is a U.S. National Phase Application under 35 U.S.C. §371 of International Application no. PCT/EP2007/063830, filed Nov. 12, 2007, and claims benefit of French Patent Application No. 06 10811, filed Dec. 12, 2006, both of which are incorporated herein. The International Application was published in French on Jun. 19, 2008 as WO 2008/071745 under PCT Article 21 (2).

CONTEXT OF THE INVENTION

1. Field of the Invention

The present invention relates to the field of passive radars, and notably the field of passive radars operating on non-cooperating opportunity transmissions, such as FM transmissions intended for the public. It deals more particularly with the processing of the FM signals reflected by objects situated in the zone covered by such transmissions for their use for detection and location purposes.

2. Prior Art

When one wishes to achieve the radar coverage, temporary or permanent, of a geographical zone, the immediate solution generally consists in implanting autonomous, active radar systems, mobile or otherwise, in such numbers that the union of the zones covered by each of the systems corresponds to the zone that it is desired to cover. Thus to cover an extended zone it is possible to choose to use a given number of radars of short or medium range or a more restricted number of long-range radars. The merging of the data provided by each system makes it possible to achieve the desired coverage.

Being autonomous active systems, each of them comprises a transmitter and a receiver whose price and complexity are dependent on the performance required by the application considered and in particular on the power transmitted by the transmitter, which power conditions the range and therefore the size of the zone covered by each system. Furthermore the deployment of such a structure even over a vast zone generally poses problems of closeness between systems covering neighboring zones within one and the same global geographical zone. These closeness problems can in part be solved by using systems operating in accordance with different frequency plans. Nevertheless, the deployment of such a set of autonomous radar systems is both complex and expensive.

A known solution for decreasing the complexity and therefore the cost of such a structure making it possible to cover a wide geographical zone, consists in using multistatic active systems comprising a single common transmitter placed at a given point of the zone and delivering sufficient power to cover this zone, and a set of receivers distant from one another and distant from the source. In such a structure each receiver generally knows the position of the common transmitter. Furthermore, in such a structure, the transmitter and the receivers are in general synchronized. In this way the coherent processing of the signals received implemented by each receiver is advantageously a processing akin to a conventional bi-static radar processing. Nevertheless such a structure which requires in particular the installation of a transmitter and means of synchronization between the transmitter and the various receivers remains complex to implement especially in the case of a mobile structure.

Another solution for decreasing the complexity of such a structure, consists in using a simply passive structure comprising receivers able to receive opportunity signals in a given frequency band, which frequency band preferably corresponds to that of transmitter equipment whose transmissions totally or partially cover the geographical zone that it is desired to cover. These transmitters being intended for a use other than the formation of a monitoring structure their transmissions are also called opportunity transmissions or non-cooperating transmissions.

Among these opportunity transmissions may for example be cited the frequency modulation transmissions (FM transmission) intended for the general public which are generally transmitted by a local transmitter covering a given geographical zone each transmission being carried out on a frequency band, or FM channel, from a hundred kilohertz to two hundred kilohertz.

This solution based on installing a passive structure, with no transmitter, presents the great advantage of limiting the complexity and therefore the cost of this structure. Its tactical deployment amounts to the dissemination over the zone to be monitored of one or more radar receivers performing the reception and the processing of the opportunity signals received. On the other hand the practical implementation of this purely passive solution comes up against a certain number of difficulties which explain why they are still little utilized.

A first difficulty which appears when one wishes to implement such a structure resides in the complexity of the signal received. Indeed the signal received by each receiver corresponds at one and the same time to the direct reception of the signal transmitted by the opportunity source (FM transmitter), to the reception of the reflections of this opportunity signal off varied fixed obstacles, these signals possibly being regarded as what the person skilled in the art knows by the name clutter, and to the reception of the "useful" signals originating from the reflections of this same source by the mobile objects that it is sought to detect. The complexity of the signal received is moreover further exacerbated by the reception of spurious signals that may for example originate from other, distant, transmitters transmitting in the same frequency band. Furthermore the useful signals (i.e. those backscattered by the mobile targets) generally exhibit a level very substantially lower than the direct reception, substantially lower than that of the reflections on fixed obstacles and substantially lower than that of the thermal noise.

Another difficulty related to the implementation of such a structure resides in the fact that the opportunity transmission corresponds to an unknown signal whose properties are not controlled (bandwidth, level of the distance and Doppler sidelobes, etc.). So, the signal transmitted by the opportunity source must be identified as such and isolated from the other signals received by the radar receiver in order to serve as reference during the correlation computations and to allow the elimination of the spurious detections corresponding to Doppler and distance sidelobes.

PRESENTATION OF THE INVENTION

An aim of the invention is to propose a solution making it possible to implement a passive monitoring structure composed of one or more passive radar systems dispersed over the geographical zone to be covered, which solution thus makes it possible to solve the difficulties cited above.

For this purpose, the subject of the invention is a method of processing the signal received by an FM passive radar including a plurality of reception pathways ($V_1$, $V_N$), the method including a phase of coherent processing carrying out a re-conditioning of the signals received and then a phase of non-coherent processing carrying out the construction of blips on the basis of the signals arising from the coherent processing. According to one or more embodiments of the invention the coherent processing includes:
- a step of forming cleansed target pathways,
- a step of regenerating the reference signal,
- a step of computing the cross-ambiguities between cleansed target pathways and regenerated reference signal,
- a step of computing the auto-ambiguity of the regenerated reference signal.

According to a preferred mode of implementation of the method according to the invention the non-coherent processing furthermore includes:
- a step of distance-Doppler extraction applied to the PEs created on completion of the step of normalization and of searching for the detections so as to construct blips,
- a step of Doppler-distance purification applied to the blips constructed after distance-Doppler extraction and carried out by means of the signal resulting from the step of computing the auto-ambiguity of the regenerated reference signal, the determination of the attributes of the blips being finally carried out on the basis of the blips obtained after the Doppler-distance purification step.

According to this preferred mode of implementation, the distance-Doppler extraction step uses the computation of the −3 dB band of the regenerated reference signal.

According to this preferred mode of implementation, the −3 dB band of the regenerated reference signal is estimated on the basis of the signal resulting from the step of computing the autoambiguity of the regenerated reference signal.

According to a preferred mode of implementation, the non-coherent processing furthermore includes:
- a step of distance ecartometry measurements,
- a step of azimuthal ecartometry measurements,
these two steps being applied to the blips constructed on completion of the Doppler-distance purification step.

According to this mode of implementation the non-coherent processing also includes a step of azimuthal purification and a step of limiting the number of blips sent.

DESCRIPTION OF THE FIGURES

The characteristics and advantages of the invention will be better appreciated by virtue of the description which follows, which description sets out the invention through a particular embodiment taken as nonlimiting example and which is supported by the appended figures, which figures represent.

DETAILED DESCRIPTION

Figure 1:
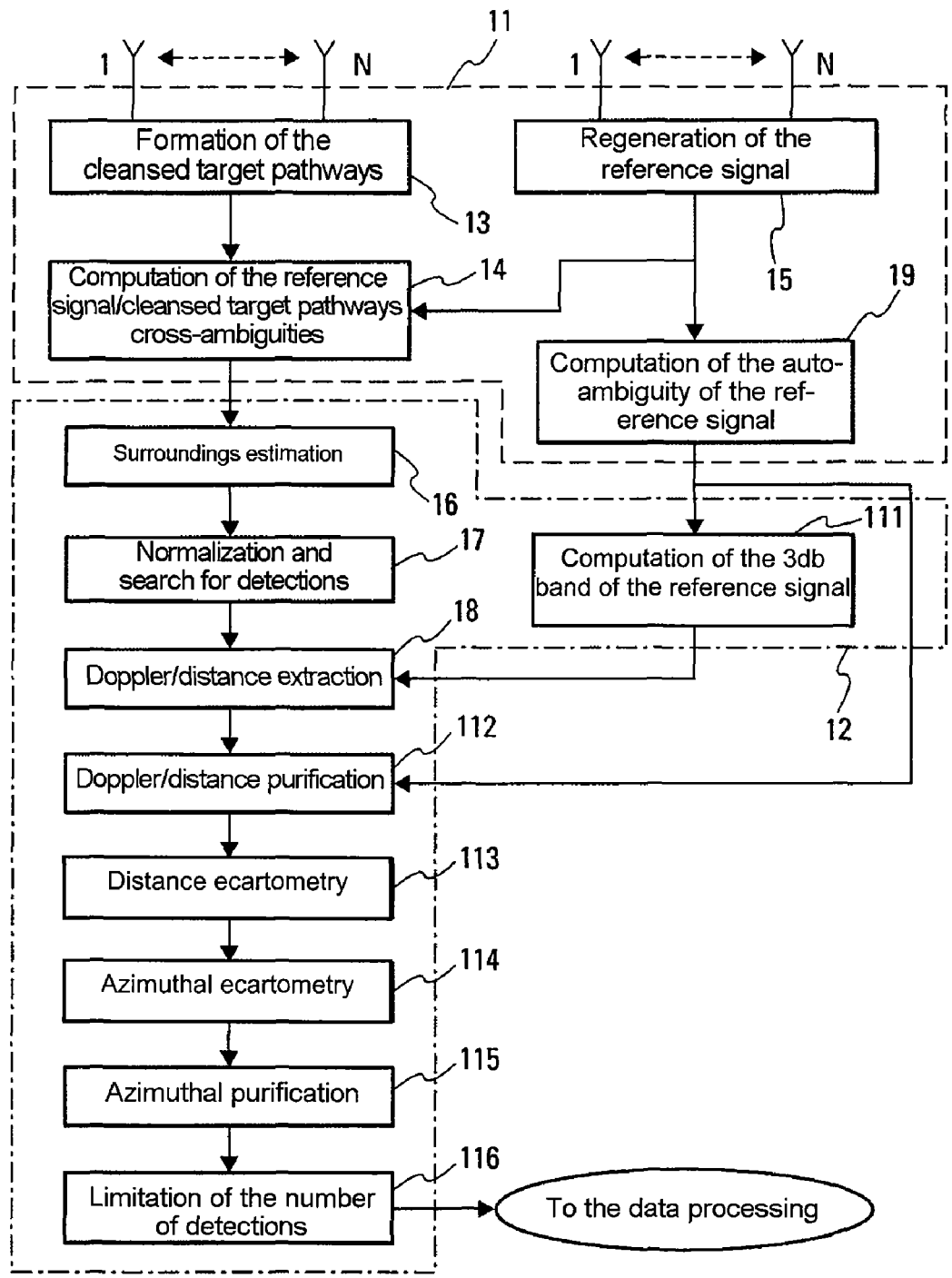
FIG. 1, a schematic diagram of all the steps of the processing according to one or more embodiments of the invention, FIGS. 2 to 3, schematic illustrations of the operating principle of the step of forming cleansed reception pathways, FIG. 4, a schematic illustration of the operating principle of the step of regenerating the reference signal, FIG. 5, a schematic illustration of the operating principle of the step of computing the reference signal/cleansed target pathways cross-ambiguities, FIGS. 6 and 7, schematic illustrations of the operating principle of the step of extracting the blips, FIG. 8, a schematic illustration of the operating principle of the distance-Doppler purification step.

Attention is first turned to FIG. 1, which presents the typical schematic overview of a signal processing method implementing one or more embodiments of the invention. The method according to one or more embodiments of the invention is here presented in its nonlimiting application to a passive radar including a plurality of independent reception pathways. To facilitate the understanding of the invention, the method is firstly presented in a general manner with all its processing steps. The steps enclosed in bold, specific to the invention, are detailed subsequently in the document. The other steps implementing known methods are simply mentioned so as to facilitate the description of the method which combines all of these steps.

As illustrated by FIG. 1, the method according to the invention implements two types of processing, a first type of processing 11, dubbed, in a manner known to the person skilled in the art, coherent processing which undertakes a re-conditioning of the signals received by the radar, followed by a second type of processing 12 dubbed non-coherent processing carrying out the construction of blips on the basis of the signals arising from the coherent processing. One speaks here of coherent processing for all the processing steps for which the signals are processed both in terms of amplitude and phase. Conversely one speaks of non-coherent processing when the phase of the signal is no longer taken into account in the processing carried out on the signal.

According to one or more embodiments of the invention, the coherent processing 11 principally includes two steps, a first step 13 of so-called "cleansed target pathway formation", and a second step 14 of coherent integration by computing the cross-ambiguities between the signal received on each "cleansed" pathway and a reference signal corresponding to the signal transmitted by the opportunity source.

The first step 13, of the coherent processing 11 is termed "cleansed reception pathway formation", since its objective is to minimize on the target pathways, pathways used in a known manner to search for detections or else "echo presences", the power of the nuisance sources which might limit the sensitivity of the radar. In the case of a passive radar, such nuisance sources may originate:
- from the signal of relatively high level with respect to the useful signals and originating in a direct path from the reference transmitter, that is to say from the opportunity source. According to one or more embodiments of the invention, this direct signal, used moreover to carry out the step of coherent integration as reference signal, constitutes by its level a significant nuisance for the reception of the useful signals whose level is generally much lower,
- from the multiple reflections of the signal transmitted by the source off fixed natural obstacles (multipaths of the reference transmitter),
- from other FM transmitters working, at least partially, in the same band as the reference transmitter and whose signal reaches the receivers of the radar considered,
- from the sources of radioelectric pollution of diverse nature.

For a system including several acquisition pathways (multi-sensor system), as is the case for a passive radar operating on FM opportunity transmissions, the elimination of the nuisance sources can be carried out in the spatial domain, by "antenna processing" of "Adaptive Computational Beam Forming" (Adaptive CBF) type or of "Opposition in the Side Lobes" (OSL) type which are types of processing well known to the person skilled in the art. These types of processing constitute the solutions customarily adopted for active radars working in the high frequency bands usually used for these radars.

The elimination of the nuisance sources can also be carried out jointly in the temporal and spatial domains. One then speaks of spatio-temporal processing. It is this second alternative that is implemented in the method according to one or more embodiments of the invention.

According to one or more embodiments of the invention, the algorithm used is an algorithm of spatio-temporal type with directional constraint, which processing is denoted by the term Spatio-Temporal Adaptive Formation (STAF, known by the term FAST in French standing for Formation Adaptative Spatio-Temporelle). This type of algorithm advantageously makes it possible to minimize the number (the multi-paths can be eliminated on the time axis) and the extent (by virtue of the use of the directional constraint) of blind angular zones appearing in the direction of the jammers. Here the term "jammer" is understood in the general sense of "disturbance".

It should be noted that the FM waveforms not being separable in terms of distance and Doppler, the elimination of the multiple paths may not be done, as is customary for active radars, by applying a filter known to the person skilled in the art by the name MTI (Mobile Targets Indicating, known as VCM in French standing for Visualisation des Targets Mobiles).

The second step 14 of the coherent processing 11 includes characterizing in terms of distance and Doppler the signal samples received, by coherent integration of the signal received over a given duration. According to one or more embodiments of the invention, the signals reflected by the targets being delayed and Dopplerized versions of the reference signal, the coherent integration of the samples of the signal received can be carried out by determining the cross-ambiguity function defined for a time shift m, lying between 0 and D and a bistatic Doppler shift n lying between 0 and M−1 by:

$$amb_{(m,n)} = \sum_{k=0}^{M-1} v_{ref}[k] v^*_{target\,cln}[k+m] e^{j\frac{2\pi nk}{M}} \quad [1]$$

for which relation:
M represents the number of temporal samples integrated in coherence,
D represents the maximum number of time shifts tested,
$v_{ref}[k]$, $0 \leq k \leq M-1$, the reference signal,
$V_{target\,cln}[k]$, $0 \leq k \leq M-1+D$, a cleansed target pathway of the direct path.

This second step is carried out for each of the cleansed pathways obtained at the previous step by using the reference signal (amplitude and phase reference) obtained after implementing the regeneration step 15. The reference signal regeneration processing is aimed at obtaining this reference signal cleansed of the multi-paths and other potential nuisance sources. Indeed:
the presence of multi-paths of high level in the reference signal could give rise to desensitization on the distance axis,
the presence of undesirable signal residuals in the reference signal might, in "severe" operating conditions, for which the level of the nuisance source might for example be "close" to that of the direct path, give rise to desensitization of the radar.
This regeneration step 15 thus advantageously makes it possible to obtain a cleansed reference signal.

Still according to one or more embodiments of the invention the non-coherent processing 12 performs in a conventional manner an ambiance estimation step 16 and a normalization-detection step 17, which steps allow the creation of echo presences or EPs. The implementation of these steps 16 and 17 is carried out in a known manner and is not detailed here.

According to one or more embodiments of the invention, it also includes, in a characteristic manner, a distance Doppler extraction step 18 the role of which is in particular to determine from among the "echo presences" obtained on completion of step 17 those which can be considered to relate to one and the same echo associated with one and the same object. Indeed, it is known that a target, in particular if it reflects a signal of high level, can give rise to the creation of a great deal of echo presence information for positions corresponding to distance-Doppler bins adjacent to that corresponding to the true position of the target. The objective of the distance-Doppler extraction is as a consequence to create a unique detection, called a blip, on the basis of the adjacent echo presences originating from one and the same target.

According to one or more embodiments of the invention, the operation of extracting blips is moreover followed by a step 112 of distance-Doppler purification the role of which is to process the targets hold after extraction and whose level is high. Indeed such targets generally exhibit Doppler and distance sidelobes which may also, on account of their level, be detected and considered to be separate targets distinct from the real target. The role of the distance-Doppler purification is to delete these spurious detections.

The non-coherent processing 12 also performs the conventional operations of distance ecartometry and azimuthal ecartometry so as to characterize each blip extracted by its position in terms of distance and its angular position. These operations carried out respectively during steps 113 and 114 are supplemented with a step 115 of azimuthal purification. The role of the azimuthal purification is to preserve only one blip when one and the same target creates detections in several angular beams.

The remaining blips are finally the subject of a load limitation step 116 intended to avoid the saturation of the downstream data processing chain.

So that the entire benefit of the method according to one or more embodiments of the invention is properly grasped by the person skilled in the art, the characteristic steps which render this method particularly suitable for processing the signals received by an FM passive radar and in particular a passive radar operating on general-public FM transmissions are presented in a more detailed manner in the subsequent description.

Attention is initially turned to the coherent processing 11 and more particularly to the following steps:
Formation of the cleansed target pathways (step 13),
Regeneration of the reference signal (step 15),
Computation of the reference signal/cleansed target pathways cross-ambiguities (step 14),
Computation of the autoambiguity of the reference signal (step 19).

Figure 2:
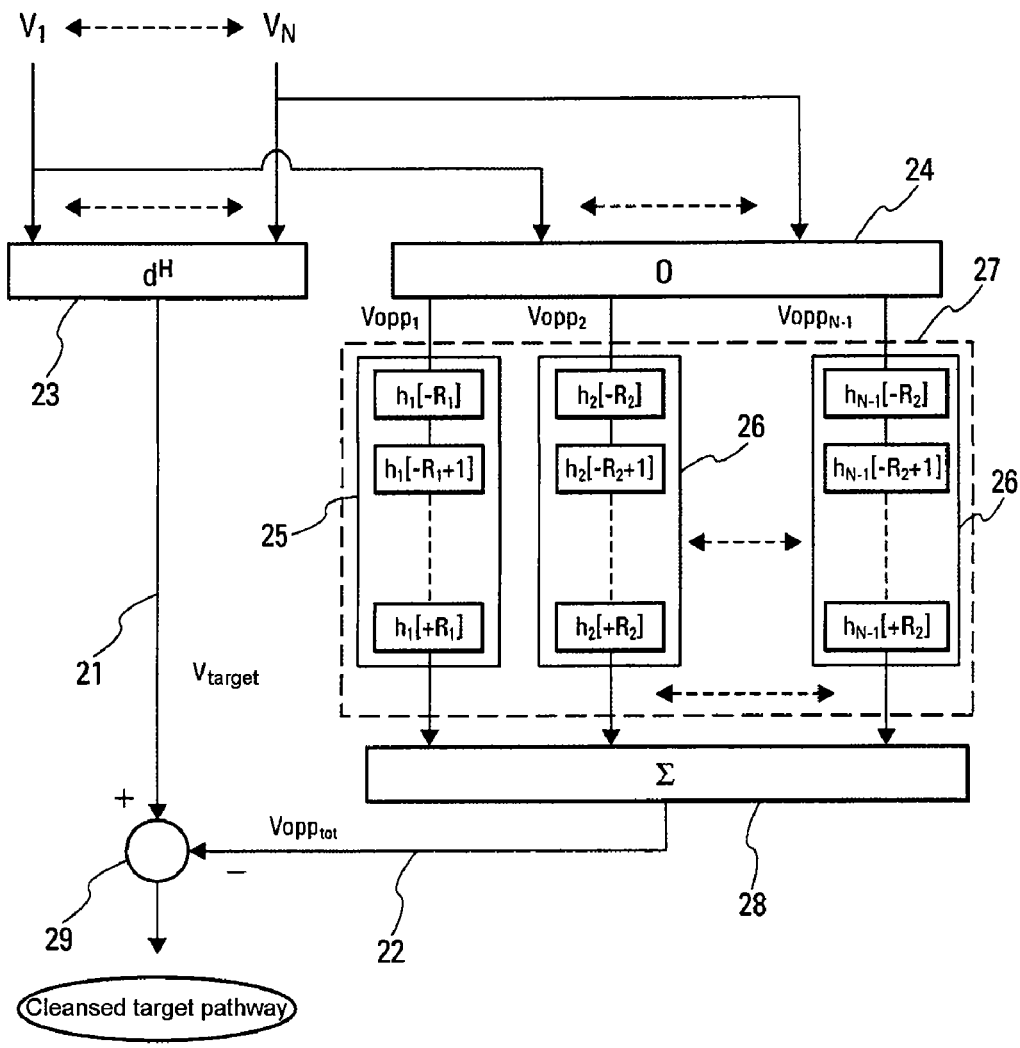
Figure 3:
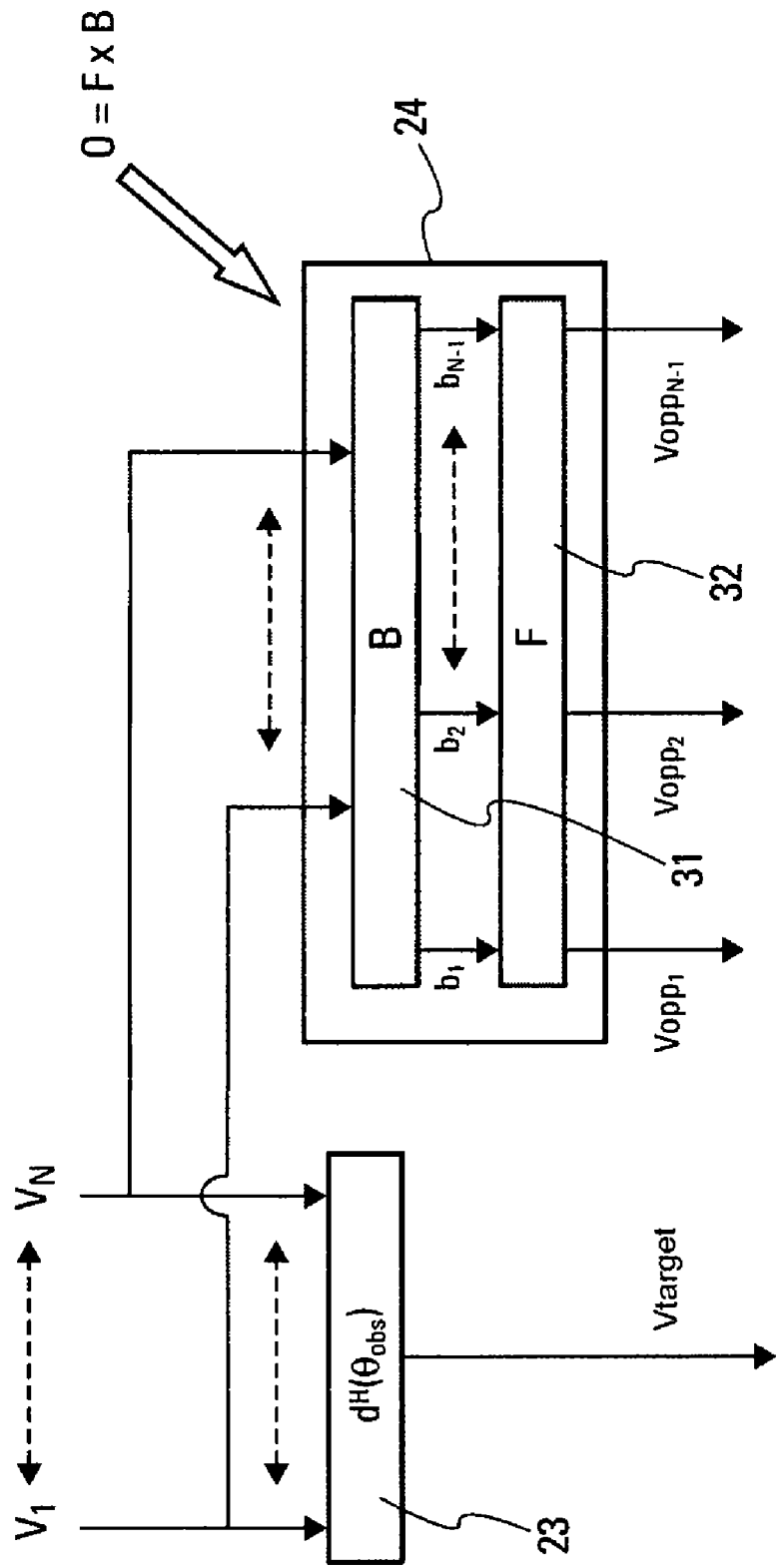
Figure 4:
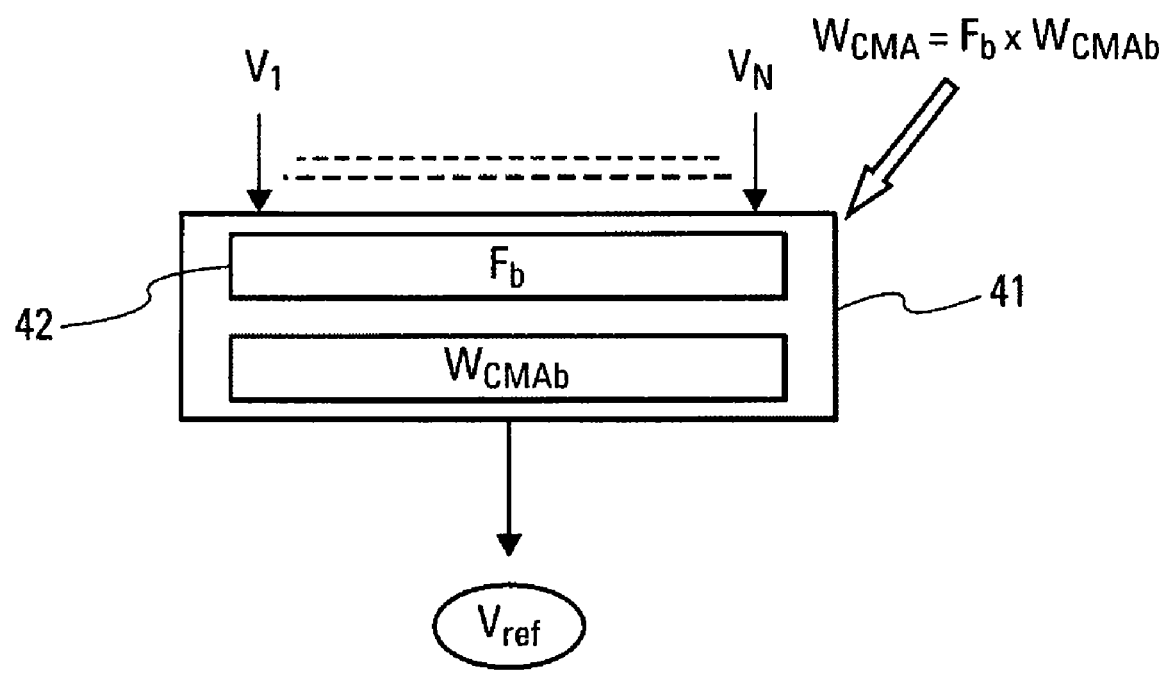

FIGS. 2, 3 and 4, which illustrate the operating principle of step 13 of forming the cleansed target pathways, are now considered.

When operating, the receiver of a passive radar receives a direct signal, of very high level originating from the source. It also receives signals originating from reflections off fixed obstacles of the signal transmitted by the source, which reflections are also called multi-paths, and, optionally, other detrimental signals which may for example originate from other FM transmission sources or else from diverse radioelectric sources of pollution. These signals, although weak compared with the direct path signal, have sufficient power to degrade the sensitivity of the radar. This is why it is also necessary to delete them. This is the role of step 13 of the method.

The principle of step 13 according to one or more embodiments of the invention principally includes deducting from the signal vtarget 21 obtained on the basis of the various reception pathways $V_1$ to $V_N$, a signal vopp$_{tot}$ 22 representing as precisely as possible the undesirable signals accompanying the useful signal. This signal vopp$_{tot}$ is obtained by means of an adaptive filtering method applied to the signals Vopp$_1$ to vopp$_{N-1}$ situated in a sub-space orthogonal to the direction of observation considered.

Step 13 thus implements, in an indirect form known by the term "Generalized Sidelobe Cancelor" (GSC), a processing of STAF type with directional constraint. The use of an indirect form of GSC type makes it possible, in a preferred form of implementation, to use filters of different length on the various opposition pathways and, consequently, to limit the computational load.

Step 13 is typically implemented by using:
1 "long" time filter 25 making it possible to optimize the elimination of the direct path signal and of its distant multi-paths,
N−2 "shorter" time filters 26 allowing the elimination of other nuisance sources whose lesser power does not necessitate the use of long time filters.

As illustrated by FIG. 2, step 13 of forming cleansed target pathways implements the following operations:
an operation 23 of determining the signal vtarget in the direction of observation considered,
an operation 24 of determining the signals vopp$_1$ to vopp$_{N-1}$ on the basis of the signals provided by the reception pathways and of the matrix O,
an operation 27 of filtering the signals vopp$_1$ to vopp$_{N-1}$ by means of the opposition filters $h_1[k]$ to $h_{N-1}[k]$,
An operation 28 of summing the filtered signals vopp$_1$ to vopp$_{N-1}$ so as to obtain the signal vopp$_{tot}$ intended to be deducted from the signal vtarget,
an operation 29 of actually subtracting the signal vopp$_{tot}$ from the signal vtarget to form the cleansed target signal.

As regards the operation 23 of computing the signal vtarget 21, this is carried out by considering:
on the one hand the vector v(k) of the signals received on the N reception pathways:

$$v(k) = \begin{vmatrix} v_1(k) \\ \vdots \\ v_N(k) \end{vmatrix} \text{ with } k \text{ varying from 1 to } N, \qquad [2]$$

on the other hand the direction of observation considered: $\theta_{obs}$,
on the other hand also the values $d_i(\theta_{obs})$, of the radiation patterns of the N antennas corresponding to the N reception pathways in the direction $\theta_{obs}$ (i varying from 1 to N).

According to one or more embodiments of the invention, the signal vtarget is obtained by calculating the product of the vector v representing the signal v received and a vector d such that the result of the product maximizes the signal-to-noise ratio (SNR) of the target pathway on white noise, under the constraint:
focusing of the signals originating from the direction $\theta_{obs}$,
non-distortion of the signals originating from the direction $\theta_{obs}$.

The vector d is therefore the direction vector associated with the direction of observation $\theta_{obs}$ and it is thus possible to write, according to one or more embodiments of the invention:

$$v\text{target}(k) = d^H v(k) \qquad [3]$$

where $d^H$ represents the conjugate transpose vector of the vector d the expression for which is given by:

$$d = \begin{pmatrix} d_1(\theta_{obs}) \\ d_2(\theta_{obs}) \\ \vdots \\ d_N(\theta_{obs}) \end{pmatrix} \qquad [4]$$

The operation which is the subject of the computation 24 for determining the signals vopp$_1$ to vopp$_N$ includes applying a matrix O to the signals $V_1$ to $V_N$ received so as to obtain signals $V_{opp}(k)$ with the characteristic of being orthogonal to the constraint d.

According to one or more embodiments of the invention, the matrix O is thus a purely spatial matrix of dimension (N−1,N) satisfying the following relations:

$$O \cdot d = 0 \qquad [5],$$

and $$\text{rank}(O) = N - 1 \qquad [6]$$

Any matrix O which satisfies relations [5] and [6] is usable for step 13. A preferred procedure for constructing such a matrix O is described hereinafter.

The computation 24 of the signals $v_{opp}(k)$ on the basis of the matrix O is performed in two operations 31 and 32 illustrated in FIG. 3.

The first operation, 31, includes applying to the signals $v_1$ to $v_N$, a matrix B of rank N−1 satisfying the equality: $B \cdot d = 0$. This matrix is defined as the matrix of dimension (N−1,N), including of the first N−1 rows of the orthogonal projector P onto $d^\perp$ defined by the following relation:

$$P = I_{N,N} - \frac{dd^H}{d^H d} \qquad [7]$$

where $I_{N,N}$ represents the identity matrix of dimension (N,N). The matrix B of dimension (N−1, N) satisfies the relation: $B \cdot d = 0$.

The application of the matrix B to the components $v_i(k)$ (i varying from 1 to N) of the signal received provides a set of N−1 signals $b_i(k)$ orthogonal to the constraint d.

The second operation, 32, includes applying to the signals $b_i$ arising from the previous operation a matrix F of dimension (N−1,N−1) in such a way that the resulting signal vopp exhibits for its component vopp$_1$, which corresponds to the pathway on which the longest time filter is applied, a maximization of the ratio of the power of the reference signal to the power of the thermal noise. This matrix F is defined by the following relation:

$$F = \begin{vmatrix} w_{ref}^H \\ 0 \quad I_{N-2,N-2} \end{vmatrix} \qquad [8]$$

in which $I_{N-2,N-2}$ represents the identity matrix of dimension (N−2,N−2).

Here $W^H_{ref}$ represents the conjugate transpose of the vector $W_{ref}$ defined by the following relation:

$$w_{ref} = R_b^{-1} \cdot B \cdot d_{ref} \quad [9]$$

where $R_b$ represents the covariance matrix of the thermal noise at the level of the signals $b_i$ and $d_{ref}$ the direction vector of the reference signal at the level of the N reception pathways, the expression for said vector being:

$$d_{ref} = \begin{pmatrix} d_1(\theta_{ref}) \\ d_2(\theta_{ref}) \\ \vdots \\ d_N(\theta_{ref}) \end{pmatrix} \quad [10]$$

The vector $w_{ref}$ constitutes the vector of spatial weightings to be applied to the signals $b_i$ to maximize the ratio of the power of the reference path to the thermal noise power on the pathway $vopp_1$.

It should be noted furthermore that if R denotes the covariance matrix of the thermal noise taken on the N reception pathways, it is possible to write:

$$R_b = B \cdot R \cdot B^H \quad [11]$$

The thermal noise being assumed spatially white on the N reception pathways, we have: $R = I_{N,N}$ and hence: $R_b = B \cdot B^H$. The expression for the vector $W_{ref}$ is then:

$$w_{ref} = (B \cdot B^H)^{-1} \cdot B \cdot d_{ref} \quad [12]$$

Hence, the matrix O is therefore defined as the product: $O = F \cdot B$.

As has already been stated previously the principal role of step 13 includes the formulation of the signal $vopp_{tot}$ which is subtracted from the signal vtarget. According to one or more embodiments of the invention the signal $vopp_{tot}$ is produced by filtering on the basis of the signals $vopp_1$ to $vopp_{N-1}$. The filtering implemented is of adaptive type and its object is to obtain a signal $vopp_{tot}$ making it possible to best eliminate the undesirable signal components. In practice it is achieved by applying to each signal $vopp_1$ to $vopp_{N-1}$ a time filter whose coefficients are recomputed periodically with the sole aim of producing at each instant the desired signal $vopp_{tot}$. The principle for computing the various coefficients of the filter applied to each signal $vopp_i$ (i varying from 1 to N–1) is presented in the subsequent description.

To perform this computation the following two vectors are formed first of all:

vopp(k) vector of the values of the opposition signals, which is composed of temporal samples of the signals $vopp_i$ (i varying from 1 to N–1) taken at various successive instants around the instant k, h vector of the coefficients of the filters applied to the signals $vopp_i$.

Moreover vtarget(k) denotes the value of the signal vtarget for the instant k (temporal sample k) considered.

The expressions for these two vectors are respectively:

$$-vopp(k) = \begin{pmatrix} v_{opp,1}(k+R_1) \\ \vdots \\ v_{opp,1}(k-R_1) \\ v_{opp,2}(k+R_2) \\ \vdots \\ v_{opp,2}(k-R_2) \\ \vdots \\ v_{opp,N-1}(k+R_2) \\ \vdots \\ v_{opp,N-1}(k-R_2) \end{pmatrix}$$

$$-h = \begin{pmatrix} h_1(-R_1) \\ \vdots \\ h_1(R_1) \\ h_2(-R_2) \\ \vdots \\ h_2(R_2) \\ \vdots \\ h_{N-1}(-R_2) \\ \vdots \\ h_{N-1}(R_2) \end{pmatrix}$$

where $R_1$ represents the delay of the opposition filter applied to the signal $vopp_1$, the length $L_1$ of the filter, that is to say the number of coefficients, being equal to $2R_1+1$, and where $R_2$ represents the delay of the opposition filters applied to the signals $vopp_2$ to $vopp_{N-1}$, the length $L_2$ of the filters being equal to $2R_2+1$.

Hence, the expression for the signal $vtarget_{cln}$ corresponding to the cleansed target pathway is:

$$vtarget_{cln}(k) = vtarget(k) - h^H \cdot vopp(k) \quad [13]$$

According to one or more embodiments of the invention the vector h is computed in such a way as to minimize the cost function J defined on K signal samples by the following relation:

$$J = \sum_{k=1}^{K} |v_{target}(k) - h^H \cdot v_{opp}(k)|^2 \quad [14]$$

The filter h minimizing the criterion J, is then defined by the following relation:

$$h = \Gamma_{vopp,vopp}^{-1} \cdot \Gamma_{vopp,vtarget} \quad [15]$$

where $\Gamma_{vopp,vopp}$ represents the matrix defined by the following relation:

$$\Gamma_{vopp,vopp} = \sum_{k=1}^{K} vopp(k) \cdot vopp(k)^H \quad [16]$$

and where $\Gamma_{vopp,vtarget}$ represents the vector defined by the following relation:

$$\Gamma_{vopp,vtarget} = \sum_{k=1}^{K} vopp(k) \cdot vtarget(k)^H \quad [17]$$

According to one or more embodiments of the invention, the solution adopted for computing h is therefore of the type of the block version of the deterministic least squares algorithm.

It should be noted therefrom that in order to improve the conditioning thereof, critical both on the space axis and on the time axis because of the high level of rejection of the receiver filters at the band limit, the matrix $\Gamma_{vopp,vopp}$ is overloaded prior to the computation of the vector h according to a principle that is well known to the person skilled in the art.

To optimize the performance of the formation of the cleansed pathways, the computation of the vector h can be updated on partially overlapping data blocks.

The raw computation of the terms of the matrix $\Gamma_{vopp,vopp}$ necessitates separate estimation of a number $N_T$ of terms equal to $(L_1+(N-2)L_2)$ $(L_1+(N-2)L_2+1)/2$, which number corresponds to the terms situated in the upper triangular part of the Hermitian matrix $\Gamma_{vopp,vopp}$. The computational load necessary for such a computation is significant and this is why, in a preferred form of implementation, the method according to one or more embodiments of the invention carries out this computation by exploiting the particular structure of the matrix $\Gamma_{vopp,vopp}$. Indeed, the Hermitian matrix $\Gamma_{vopp,vopp}$ can be written in the following form:

$$\Gamma_{vopp,vopp} = \begin{vmatrix} \Gamma_{vopp_1,vopp_1} & \Gamma_{vopp_1,vopp_2} & \cdots & \Gamma_{vopp_1,vopp_{N-1}} \\ \Gamma^H_{vopp_1,vopp_2} & \Gamma_{vopp_2,vopp_2} & \ddots & \vdots \\ \vdots & \ddots & \ddots & \Gamma_{vopp_{N-2},vopp_{N-1}} \\ \Gamma^H_{vopp_1,vopp_{N-1}} & \cdots & \Gamma^H_{vopp_{N-2},vopp_{N-1}} & \Gamma_{vopp_{N-1},vopp_{N-1}} \end{vmatrix} \quad [18]$$

each of the Hermitian sub-matrices $\Gamma_{vopp,vopp}$, of the matrix $\Gamma_{vopp,vopp}$ furthermore having the following structure:

$$\Gamma_{vopp_i,vopp_i} = \quad [19]$$

$$\begin{vmatrix} \sum_{k=1}^{K} vopp_i(k+R_i) \cdot vopp_i^*(k+R_i) & \sum_{k=1}^{K} vopp_i(k+R_i) \cdot vopp_i^*(k+R_i-1) & \cdots & \sum_{k=-1}^{K} vopp_i(k+R_i) \cdot vopp_i^*(k-R_i+1) \\ \left(\sum_{k=1}^{K} vopp_i(k+R_i) \cdot vopp_i^*(k+R_i-1)\right)^* & \sum_{k=0}^{K-1} vopp_i(k+R_i) \cdot vopp_i^*(k+R_i) & \ddots & \vdots \\ \vdots & \ddots & \ddots & \vdots \\ \left(\sum_{k=1}^{K} vopp_i(k+R_i) \cdot vopp_i^*(k-R_i+1)\right)^* & \cdots & \cdots & \sum_{k=1-L_1+1}^{K-L_1+1} vopp_i(k+R_i) \cdot vopp_i^*(k+R_i) \end{vmatrix}$$

In this way, for any row m and for any column n of the matrix $\Gamma_{vopp,vopp}$, it is possible to write, for $m \leq n$:

$$\Gamma_{vopp_i,vopp_i}(m,n) = \sum_{k=1}^{K} vopp_i(k+R_i+1-m) \cdot vopp_i^*(k+R_i+1-n) \quad [20]$$

or else:

$$\Gamma_{vopp_i,vopp_i}(m,n) = \sum_{k=2-m}^{K-m+1} vopp_i(k+R_i) \cdot vopp_i^*(k+R_i+m-n)), \quad [21]$$

or else:

$$\Gamma_{vopp_i,vopp_i}(m,n) = \overbrace{\sum_{k=2-m}^{0} vopp_i(k+R_i) \cdot vopp_i^*(k+R_i+(m-n))}^{(1)} + \overbrace{\sum_{k=1}^{K-L_i+1} vopp_i(k+R_i) \cdot vopp_i^*(k+R_i+(m-n))}^{(2)} + \overbrace{\sum_{k=K-L_i+2}^{K-m+1} vopp_i(k+R_i) \cdot vopp_i^*(k+R_i+(m-n))}^{(3)}. \quad [22]$$

By consulting relation [22], it is noted that the terms (1), (2) and (3) constitute, respectively, the sums of (m−1), (K−$L_i$) and ($L_i$−m) products. It is furthermore noted that the term (2) depends only on the difference (m−n), and that it therefore need be computed only once for all the terms of $\Gamma_{voppi,voppi}$ that are situated on one and the same sub-diagonal. Finally it is noted that the computational load due to the computations of the terms (1) and (3) is negligible insofar as K−$L_i$>>$L_i$−1. In this way, the estimation of the sub-matrices $\Gamma_{voppi,voppi}$ is therefore akin, to first order, in terms of computational load, to the computation of $L_i$ values (the $L_i$ values of the term (2)), although in a raw computation it corresponds to the computation of $L_i$ ($L_i$+1)/2 values, these values corresponding to the number of terms situated in the upper triangular part of the Hermitian matrix $\Gamma_{voppi,voppi}$.

By proceeding in an analogous manner, it is possible to compute at lesser cost the terms of the sub-matrices $\Gamma_{voppi,voppi}$ (with i≠j) which are situated on one and the same sub-diagonal.

The computation of the term (2) for each sub-diagonal therefore constitutes the largest share of the computational load. It includes, for a matrix of type $\Gamma_{voppi,voppi}$ in evaluating the term C(m−n) defined for the parameters m (row number) and n (column number) by the following relation:

$$C(m-n) = \sum_{k=1}^{K-L_i+1} vopp_i(k+R_i) \cdot vopp_i^*(k+R_i+(m-n)) \quad [23]$$

with:

$m \leq n$, $1 \leq m \leq L_i$, $1 \leq n \leq L_i$.

For large enough values of $L_i$ it is advantageous, in terms of computational load, to perform the estimation of the terms C(m−n) in the spectral domain. To do this the following quantities are defined:

$N = K - L_i + 1$, $D = N + L_i - 1$, $vopp_{synch}(k) = vopp_i(k+R_i+1)$ for $k=0, \ldots N-1$, $vopp_{comp}(k) = vopp_i(k-R_i+1)$ for $k=0, \ldots D-1$.

Thereafter, on the basis of $vopp_{synch}(k)$ and $vopp_{comp}(k)$ the sequences $vopp_{synchpad}(k)$ and $vopp_{comppad}(k)$ of length S are constructed by "0 padding", S being the smallest power of 2 greater than or equal to $N+2(L_i-1)$. Then $VFopp_{synch}(I)$ and $VFopp_{comp}(I)$ are computed, these being respectively the results of the fast Fourier transforms of $vopp_{compad}(k)$ and $vopp_{synchpad}(k)$.

The temporal signal p(k) defined, for $0 \leq k \leq S-1$, by:

$$p(k) = FFT^{-1}(VFopp_{synch}(I) VFopp_{comp}*(I)),$$

is deduce from $VFopp_{synch}$ and $VFopp_{comp}$,

Hence, for each pair (m,n) such that:

$1 \leq m \leq L_i$, $1 \leq n \leq L_i$, $m \leq n$, it is possible to write:

$$C(m-n) = \sum_{k=1}^{N} vopp_i(k+R_i) vopp_i^*(k+R_i+(m-n))$$

$$= p(S - L_i + 1 - (m-n)) \text{ for } m-n \neq 1 - L_i,$$

$$= p(0) \qquad \text{for } m-n = 1 - L_i,$$

In practice, to maximize the load reduction afforded by the computation in the spectral domain, the estimation of the values of the signals p(k) is performed on several contiguous temporal sub-blocks so as to use FFTs of reduced size. The values of C(m−n) are then obtained by summing the values of the signals p(k) computed on the various sub-blocks.

This principle of passing to the spectral domain, described previously, can obviously also be used to reduce the computational load induced by the computation of the terms of the type C(m−n) of the matrices $\Gamma_{voppi,voppj}$ with i≠j, to the extent of course that the lengths $L_i$ of the filters justify this. It can also be used to perform the computation of the vector $\Gamma_{vopp,vtarget}$.

Attention is now turned to FIG. 4, which illustrates the principle implemented for carrying out step 15 of the method according to the invention, the step of regenerating a reference signal.

In order to obtain the reference signal making it possible to perform the coherent integration and to facilitate the steps of extraction and Doppler/distance purification of the non-coherent processing, the method according to one or more embodiments of the invention implements, as was stated previously, a step termed "step of regenerating a reference signal" the aim of which is to obtain a reference signal which is as similar as possible to the signal transmitted by the source. This signal should be ridded, like the signal vtarget, of the signals arising from the multiple paths and other potential nuisance sources.

One of the characteristics of the processing for regenerating a reference signal is that it should discriminate, in a blind manner, the reference signal from the other signals.

The procedure used by the method according to one or more embodiments of the invention to carry out this blind discrimination uses the property of constant modulus of the FM signals to find a collection of purely spatial weightings which, applied to the signals received on the antenna, gives as output the estimation of the reference signal.

The algorithms of the family known by the acronym CMA standing for "Constant Modulus Algorithm" make it possible to carry out the blind equalization of constant modulus signals.

In a preferred form of implementation, the method according to the invention uses a variant CMA algorithm known by the acronym LS-CMA standing for "Least Square Constant Modulus algorithm". The latter in fact offers a good compromise between performance and computational load. FIG. 4 illustrates the operating principle of this algorithm.

The LS-CMA algorithm is a block iterative algorithm for which the weightings applied to the input signals $v_1$ to $v_N$ are computed by successive iterations on one and the same block of data. Its object is to determine the vector $v_{ref}$ and the vector $W_{CMA}$ which are solutions of the least squares problem formulated by the following relation:

$$\arg\min_{Wcma, Vref} = \|w_{CMA}^H \cdot v - v_{ref}\|^2 \qquad [24]$$

in which the expressions for v, $v_{ref}$ and $W_{CMA}$ are respectively:

$$v = \begin{vmatrix} v_1(1) & \cdots & v_1(M) \\ \vdots & & \vdots \\ v_N(1) & \cdots & v_N(M) \end{vmatrix},$$

$$v_{ref} = |v_{ref}(1) \ldots v_{ref}(M)|$$

$$w_{CMA} = \begin{vmatrix} w_{1CMA} \\ \vdots \\ w_{NCMA} \end{vmatrix}$$

v is the matrix of the signals received $v_i(k)$ on the N reception pathways over the duration of the coherent integration.

$W_{CMA}$ is the vector of the CMA weightings making it possible to reconstruct the reference signal having a constant modulus, The signal $v_{ref}$ is for its part the constant modulus signal which represents the estimation of the reference signal. This is the so-called "regenerated" reference signal.

A feature of the processing method according to one or more embodiments of the invention is that it should be able to take account of the large dynamic swing of the processed signals, the reference signal possibly being received with a level 70 dB higher than that of the noise. This significant dynamic swing can cause difficulties in implementing the corresponding digital computations.

To take account of this feature of the processed signals, step 15 of the method begins, as illustrated by FIG. 4, the operation 41 of actually evaluating the weightings $W_{CMA}$, such as is provided for by the CMA algorithm, with an operation 42 of so-called "whitening of the signal space" and dimension reduction.

The signal space whitening operation begins with the computation of the sensor signals covariance matrix $R_v$ defined by the following relation:

$$R_v = \frac{1}{M} \cdot v \cdot v^H \qquad [25]$$

The (positive defined) matrix $R_v$ is thereafter diagonalized in an orthonormal basis according to:

$$R_v = U_V D_V U_V^H,$$

where the eigenvalues of $R_v$ are ranked in decreasing order along the diagonal of $D_V$.

The matrices $D_V$ and $U_V$, are thereafter respectively used to construct the matrices $D_{Vred}$ and $U_{Vred}$, which matrices are extracted from $D_V$ and $U_V$ by retaining only the eigenvalues of these matrices, and the associated eigenvectors, whose dynamic swing with respect to the largest eigenvalue of $D_V$ is less than about 50 dB (so-called dimension reduction operation). The whitening filter $F_b$ applied to the input data $v_i(k)$ is then deduced from $D_{Vred}$ and $U_{Vred}$ through the relation:

$$F_b = U_{Vred} \cdot D_{Vred}^{-1/2} \quad [26]$$

Hence the whitened input data $V_{bi}(k)$ are obtained on the basis of the input data $v_i(k)$ by using the following relation:

$$V_b = F_b^H \cdot V \quad [27]$$

These whitened data constitute according to one or more embodiments of the invention the input data of the LS-CMA iterative algorithm.

Initially, the vector of the weightings $V_{CMAb}$ in the whitened signals space is initialized to a value $w_{CMAb\_init}$. If the reference signal is the most powerful, the value given hereinafter can be used:

$$w_{CMAb} = w_{CMAb\_init} = \begin{vmatrix} 1 \\ 0 \\ \vdots \\ 0 \end{vmatrix}$$

Then, at each iteration of the algorithm, a new value of $W_{CMAb}$ is computed in accordance with the algorithm described below:

The vector Y of the signals obtained as output from the pathway formation is formed with the value of $W_{CMAb}$ obtained at the previous iteration. The expression for Y is:

$$Y = W_{CMAb}^H \cdot V_b \quad [28]$$

The vector $Y_{mod\_cst}$, associated with a constant modulus signal, is deduced from Y. $Y_{mod\_cst}$ is a vector whose components are obtained by dividing each component of Y by its modulus:

$$Y_{mod\_cst} = [Y_i / |Y_i|]_i \quad [29]$$

The components of the weighting vector $W_{CMAb}$ are updated on the basis of $Y_{mod\_cst}$ by performing the following operation:

$$W_{CMAb} = Y_{mod\_cst} \cdot pinv(V_b))^H \quad [30]$$

where pinv denotes the Moore-Penrose inverse.

Hence, after a few iterations (of the order of 5 to 10), the value of the components of the sought-after weighting vector $W_{CMA}$ is deduced from those of the vector $W_{CMAb}$ by applying the relation:

$$W_{CMA} = F_b \cdot W_{CMAb} \quad [31]$$

The vector representing the reference signal 43 is then obtained by applying the weighting coefficients to the input signal 44.

Figure 5:
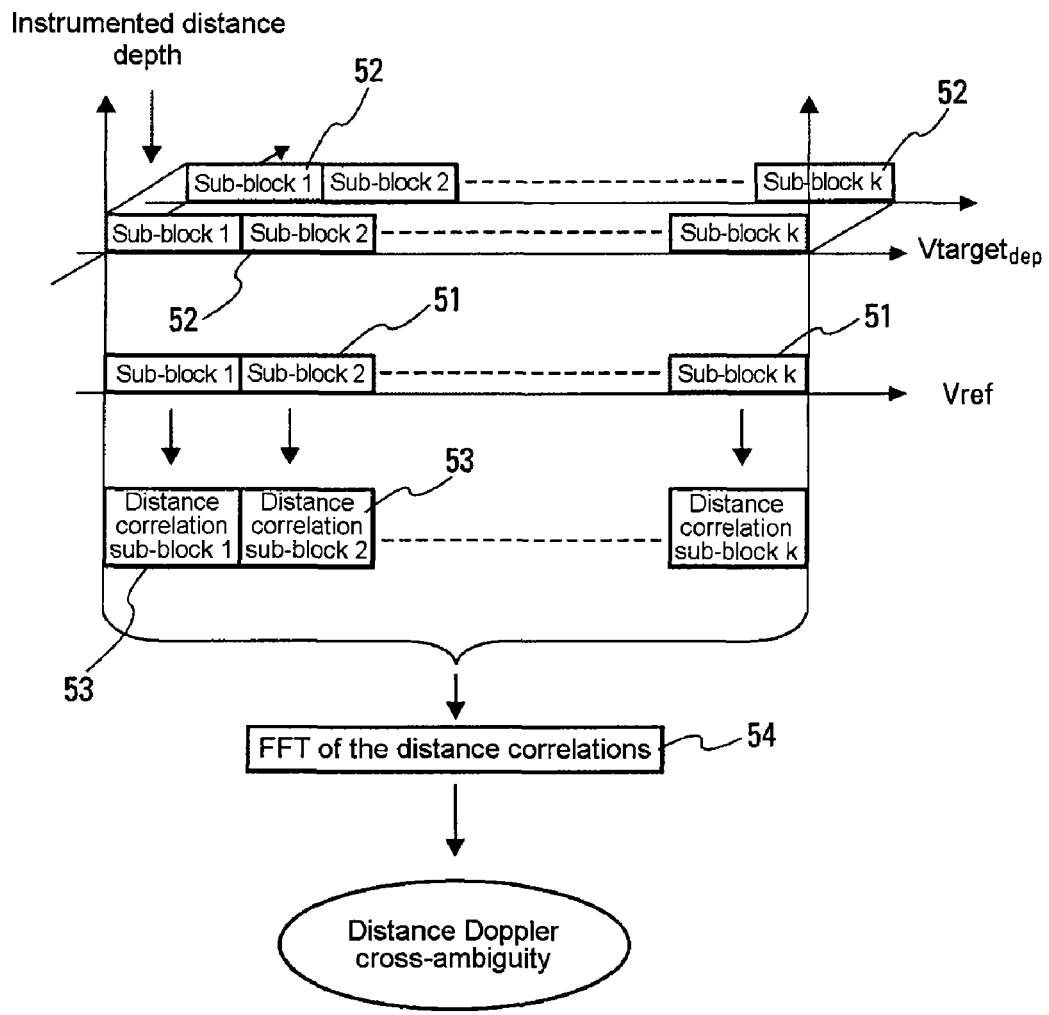

Attention is now turned to FIG. 5 which illustrates in a schematic manner the operating principle of the operation performed during step 14 of the method according to the invention, step of so-called "computing the reference signal/cleansed target pathways cross-ambiguities" which carries out the actual coherent integration of the signals back-scattered by the observed objects, or targets. The object of this step is to carry out an analysis of the signal received on the distance axis and on the Doppler axis, through distance-Doppler cells (m,n) of defined size and on a likewise defined distance-Doppler domain.

If we initially consider the number M of temporal samples integrated in coherence, the maximum number D of distance shifts tested, the reference signal $v_{ref}[k]$ obtained by step 15 of the method for $0 \leq k \leq M-1$ and the cleansed target signal $v_{targetcln}[k]$ obtained by step 13 for $0 \leq k \leq M-1+D$, the signals reflected by the targets being moreover considered to be delayed and Dopplerized versions, that is to say suffering a frequency shift due to the movements of the target, of the reference signal, the coherent integration carried out by the method according to one or more embodiments of the invention includes computing the quantity amb(m,n), called the cross-ambiguity. This quantity is given by the following relation:

$$amb(m,n) = \sum_{k=0}^{M-1} v_{ref}[k] v_{targetcln}^*[k+m] e^{j\frac{2\pi nk}{M}} \quad [32]$$

where $v_{targetcln}^*[k]$ corresponds to the conjugate of $v_{targetcln}[k]$, and where the parameter m, lying between 0 and D, characterizes the delay of the target signal with respect to the reference signal and the parameter n, lying between 0 and M−1, characterizes the bistatic Doppler frequency of the target.

The computation of the function amb(m,n) can naturally be carried out in a direct manner by computing, for each value of k and of m, the products of the type $v_{ref}[k] v_{targetcln}^*[k+m]$, and then by evaluating the FFTs of the temporal signals thus obtained for each value of m. However the computational load resulting from such a computation is generally excessive. This is why in the method according to one or more embodiments of the invention an indirect fast computation procedure, which advantageously induces a lower computational load, is used. The principle of this procedure is described subsequently in the description.

The principle of the procedure described here relies on the fact that the speed of the targets to be processed not exceeding 2 to 3 times the speed of sound, the maximum Doppler frequency to be instrumented, $f_{dmax}$, is much lower than the ambiguous Doppler frequency for a sampling frequency of the order of 150 kHz.

Thus, for example, for a passive radar operating in the general-public FM band, that is to say at a frequency close to f=100 MHz, the value of $f_{dmax}$ is:

$$F_{dmax} = \frac{2 v_{max}}{\lambda} \approx \frac{2 \cdot 1000}{3} \approx 667 \text{ Hz}.$$

Hence it is possible to neglect the variation in the Doppler phase of the signal received over sub-blocks of a few tens of successive samples.

Thus, as the Doppler phase variation of the signals received can be neglected over a few tens of consecutive samples, it is possible to estimate the cross-ambiguity by performing correlation computations solely on the distance axis on sub-blocks of L samples, and then by computing the FFT of these correlations in distance. The computation of the distance correlations can furthermore be performed in the spectral domain, the effect of this being to substantially decrease the computational load. It is on these principles that the processing carried out is based.

According to this preferred form of implementation, the computation of the cross-ambiguities is performed in two steps.

The first step includes computing, on sub-blocks 51 and 52 of L samples of the regenerated reference signal and of the cleansed target signal, the elementary distance correlations cdist(m,s) 53 defined by the following relation:

$$cdist(m, s) = \sum_{k=sL}^{(s+1)L-1} v_{ref}[k] v^*_{targetcln}[k+m] \quad [33]$$

with:

$0 \leq m \leq D,$ $0 \leq s \leq M/L - 1,$

L here taking an integer value dividing M.

In order to reduce the computational load, the computation of the elementary distance correlations cdist(m,s) is performed in the spectral domain, and not directly.

In this way, if the case where s is equal to 0 is considered for example, the computation of the elementary distance correlations cdist(m,s) is carried out on the basis of the relation:

$$cdist[m] = \sum_{k=0}^{L-1} v_{ref}[k] v^*_{targetcln}[k+m], \text{ with } 0 \leq m \leq D, \quad [34]$$

The computation of cdist(m) in the spectral domain can then be described as follows.

Let $L_2$ be the smallest power of 2 greater than or equal to L+2D. The signal $v_{refpad}[k]$ (for $0 \leq k \leq L_2-1$) is constructed by "zero padding" on the basis of $v_{ref}[k]$ (for $0 \leq k \leq L-1$). The signal $v_{targetclnpad}[k]$ (for $0 \leq k \leq L_2-1$) is likewise constructed, again by "zero padding", on the basis of $v_{targetcln}[k]$ (for $0 \leq k \leq L-1+D$).

The quantities $Vf_{refpad}$ and $Vf_{targetcln}$ are thereafter computed by applying FFTs on $L_2$ points to the signals $V_{refpad}$ and $V_{targetclnpad}$ respectively. Finally, the signal p[k] defined for $0 \leq k \leq L_2-1$ by the following relation:

$$p = FFT^{-1}(Vf_{refpad} Vf_{targetcln}^*), \quad [35]$$

is computed on the basis of $Vf_{refpad}$ and $Vf_{targetcln}$.

In this way, cdist(m) is obtained by the following relation:

$$cdist[m] = p(0) \quad \text{pour } m = 0 \quad [36]$$
$$= p(L_2 - m) \quad \text{pour } 1 \leq m \leq D,$$

The second step 54, for its part, includes deducing from the elementary distance correlations cdist(m,s) thus computed, the cross-ambiguity values amb(m,n) by applying the following relation:

$$amb(m,-n) = FFT_s(cdist_{pad}(m,s))_{s=-n} \quad [37]$$

with:

$0 \leq m \leq D,$ $0 \leq n \leq M_{L,2} - 1$, $M_{L,2}$ representing the smallest power of 2 greater than or equal to M/L.

In relation [37], $FFT_s$ denotes an FFT computation with respect to the variable s and $cdist_{pad}(m,s)$ represents the quantity deduced from cdist(m,s) by a "zero-padding" operation carried out with respect to the smallest power of 2 greater than or equal to M/L, denoted $M_{L,2}$.

On completion of these two computation steps, the cross-ambiguities computed for each pair of values (m,n) of the distance/Doppler domain of interest are thus obtained.

Attention is now turned to step 19 of computing the auto-ambiguity of the reference signal. The knowledge of the auto-ambiguity of the reference signal obtained on completion of step 15 is necessary for the implementation of steps 111 and 112, of Computing the 3 dB Band of the Reference signal and of Doppler/distance Purification, of the incoherent processing.

By analogy with the reference signal/cleansed target pathway cross-ambiguity (cf. relation [1]), the auto-ambiguity of the reference signal is defined by the following relation:

$$autoamb(m, n) = \sum_{k=0}^{M-1} v_{ref}[k] v^*_{cref}[k+m] e^{\frac{j2\pi nk}{M}} \quad [38]$$

where:

M represents the number of temporal samples integrated in coherence,

D represents the maximum number of distance shifts tested for the detection of targets, $v_{ref}[k]$, the measured reference signal for $0 \leq k \leq M-1$, $V_{cref}[k]$, the measured reference signal augmented by the D previous and following distance bins. $-D \leq k \leq M-1+D$, The parameter m, lying between −D and D, represents a positive or negative delay, and the parameter n, lying between 0 and M−1, represents the bistatic Doppler frequency.

As in the case of the cross-ambiguity, the direct computation of autoamb(m,n) generally leads to a significant, or indeed prohibitive, computational load. This is why in the method according to the invention, this computation is carried out by an alternate procedure analogous to that adopted for computing the cross-ambiguities. This procedure which includes a first step in computing, in the spectral domain, "purely distance" auto-correlations on sub-blocks of L samples, and then, in a second step, in evaluating the FFTs thereof, is described hereinafter.

The first step includes computing, on sub-blocks of L samples, elementary distance auto-correlations acdist(m,s) defined by the following relation:

$$acdist(m, s) = \sum_{k=sL}^{(s+1)L-1} v_{ref}[k] v^*_{cref}[k+m] \quad [39]$$

in which m represents an integer such that $-D \leq m \leq D$ and s an integer such that $0 \leq s \leq M/L - 1$, L representing for its part an integer dividing M.

The second step includes computing, on the basis of the elementary distance auto-correlations acdist(m,s), the values of the auto-ambiguities autoamb(m,n) defined by:

$$auto-amb(m,-n) = FFT_s(acdist_{pad}(m,s))_{s=-n}$$

where $acdist_{pad}(m,s)$ represents the signal deduced from acdist(m,s) by "zero-padding" with respect to the smallest power of 2 greater than or equal to M/L, denoted $M_{L,2}$ and where $FFT_s$ denotes an FFT computation with respect to the variable s.

Here the parameter m lies between −D and D, and the parameter n between 0 and $M_{L,2}-1$.

To reduce the computational load, the computation of the elementary distance auto-correlations acdist(m,s) is performed, like the computation of the elementary correlations cdist(m,s) intervening during step 14, in the spectral domain, and not in a direct manner. The computation of the elementary distance auto-correlations acdist(m,$) in the spectral domain is described below for a zero value of s so as to simplify the notation. We then have:

$$acdist[m] = \sum_{k=0}^{L-1} v_{ref}[k] v_{cref}^*[k+m] \quad [40]$$

with:

$-D \leq m \leq D$.

Let $L_2$ be the smallest power of 2 greater than or equal to L+4D. The signal $v_{refpad}[k]$ defined for $0 \leq k \leq L_2-1$ is constructed by "zero padding", on the basis of $v_{ref}[k]$ defined for $0 \leq k \leq L-1$.
Likewise, the signal $v_{crefpad}[k]$ defined for $0 \leq k \leq L_2-1$, is constructed by shifting by D samples and "zero padding", on the basis of $v_{cref}[k]$ defined for $-D \leq k \leq L-1+D$.
The quantities $Vf_{refpad}$ and $Vf_{crefpad}$ are computed thereafter by applying FFTs on $L_2$ points to the signals $v_{refpad}$ and $v_{crefpad}$ respectively.
The signal p[k] defined for $0 \leq k \leq L_2-1$ by the relation:

$$p = FFT^{-1}(Vf_{refpad} Vf_{crefpad}^*) \quad [41]$$

is computed on the basis of $Vf_{refpad}$ and $Vf_{crefpad}$.
In this way, acdist(m) is obtained through the following relation:

$$acdist[m] = p(0) \quad \text{for } m = -D \quad [42]$$
$$= p(L_2 - (m+D)) \quad \text{for } -D+1 \leq m \leq D,$$

Figure 6:
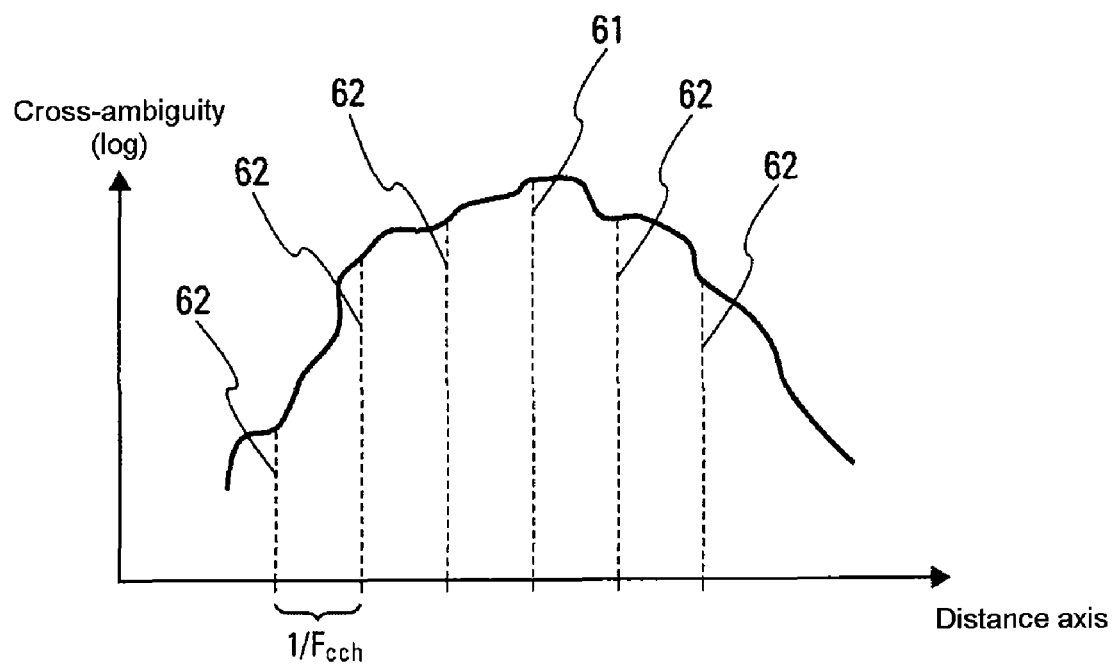
Figure 7:
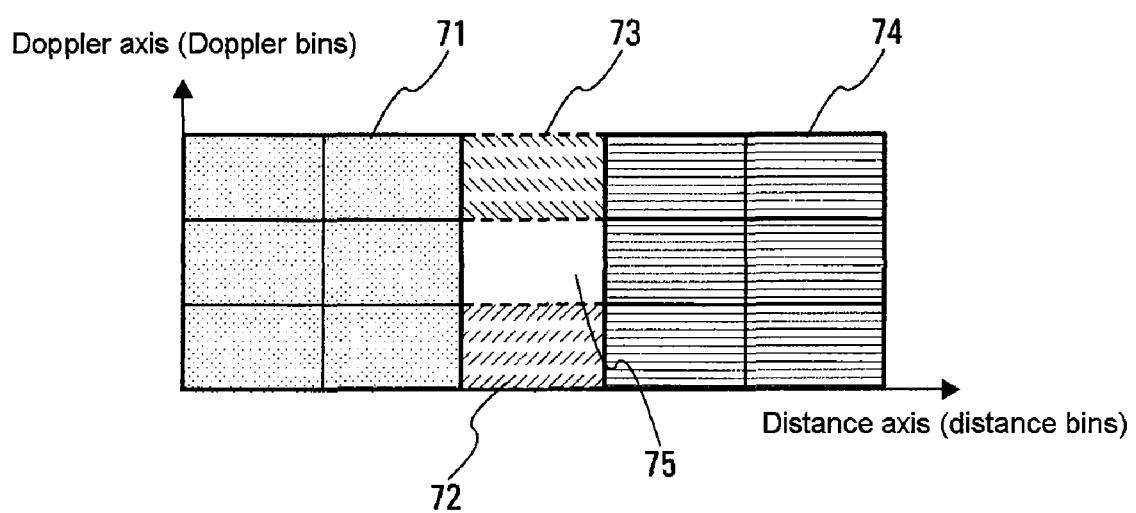

The reference signal autoambiguity autoamb(m,n) thus determined for each Doppler distance bin is used during the steps of computing the 3 dB band of the reference signal (111) and of Doppler/distance purification (112).
Attention is subsequently turned to the non-coherent processing 12 and more particularly to the following steps:
Computation of the 3 dB band of the reference signal (step 111),
Doppler-distance extraction (step 18),
Doppler-distance purification (step 112).
Being characteristic steps of the non-coherent processing, attention is firstly turned to FIGS. 6 and 7 which illustrate the operating principle of the distance-Doppler extraction step 18.
The distance-Doppler extraction step is applied to the "echo presence", or EP, information obtained in a known manner on the basis of the samples of the cross-ambiguity signal computed by the coherent processing and of the surroundings estimation associated with each sample by applying a normalization and detection operation of TFAC type, which is known elsewhere and not described here, to these samples. During this operation the signal level corresponding to each sample, or distance-Doppler bin, is normalized by the surrounding level associated with it and then compared, with a fixed threshold. Hence, each distance-Doppler bin whose normalized level exceeds the threshold is detected and marked as representing an echo presence or EP.
However, as illustrated by FIG. 6 for the distance axis, it is known that a target whose ambiguity function is centered on a given bin may give rise to the detection of several EPs, a detection 61 in the distance-Doppler bin in which to the target is actually situated and other detections 62 in the distance-Doppler bins adjacent to the distance-Doppler bin in which the target is situated. This is due to the fact that the principal lobe of the cross-ambiguity function has a certain width, dependent on the 3 dB band of the reference signal, and exhibits flanks having finite steepness.
To process this phenomenon of the creation of multiple EPs on the basis of a single target it is known to implement, after detecting the EPs, a Doppler/distance extraction operation the object of which is to create a unique detection, called a blip, on the basis of the adjacent EPs probably originating from one and the same target. However within the particular context of an FM passive radar this operation exhibits a certain number of specific characteristics.
The extraction procedure implemented according to one or more embodiments of the invention includes retaining only a single EP per target by keeping, out of all the EPs obtained, only the EPs corresponding to local maxima of the cross-ambiguities on the distance and Doppler axes. Now, the ratio of sampling frequency to 3 dB bandwidth of the FM signals, which ratio fixes in particular the distance extent, in number of bins, of the principal lobe of the auto-ambiguity, fluctuates over time, so that the number of distance bins taken into account for the local maximum test should be tailored dynamically to the value of this parameter.
This is why the Doppler-distance extraction includes here in creating a blip on the basis of a detection in a distance-Doppler bin $(n_{dop}, n_{dist})$, if the logarithmic modulus of its cross-ambiguity, log mod$(n_{dop}, n_{dist})$, satisfies the following relation:

$$\log \text{mod}(n_{dop}, n_{dist}) > \log \text{mod}(n_{dop}+i, n_{dist}+j) \quad [43]$$

for each distance-Doppler bin $(n_{dop}+i, n_{dist}+j)$ belonging, as illustrated by FIG. 7, to a neighborhood E, formed of the union of the groups of distance-Doppler bins 71 to 74 encompassing the bin 75 considered and defined by:

$$E = \{[n_{dop}-1, n_{dop}+1] \times [n_{dist}-n_{ssechdist}, n_{dist}-1]\} \cup \quad [44]$$
$$\{n_{dop}-1, n_{dist}\} \cup \{n_{dop}+1, n_{dist}\} \cup$$
$$\{[n_{dop}-1, n_{dop}+1] \times [n_{dist}+1, n_{dist}+n_{ssechdist}]\}$$

where $n_{s\ sec\ hdist}$ represents the nearest integer (EPP) to the ratio $$\left(\frac{F_{smp}}{B_{3dB}}\right),$$

$B_{3\ dB}$ representing the estimation of the 3 dB bandwidth of the FM signal received for the current burst.
As may be noted in the foregoing, in order to be carried out, the extraction step 18 according to one or more embodiments of the invention has to know the value $B_{3\ dB}$ of the band of the signal at 3 dB. The method according to one or more embodiments of the invention determines this band $B_{3\ dB}$ by implementing a computation step 111 on the regenerated reference signal.
According to one or more embodiments of the invention, the 3 dB band of the reference signal is deduced from the auto-ambiguity function of the regenerated reference signal, by applying the procedure described hereinafter.
The section along the distance axis of the auto-ambiguity function can be approximated on a linear scale and around the zero distance, by a Gaussian. As a result, on a logarithmic scale, the distance cut may be regarded as a parabola:

$$\text{Auto-}amb\text{-}dist\text{-}\log(d)=ad^2+bd+c \quad [45]$$

where:
   Auto-amb-dist-log(d) is the logarithmic modulus of the distance section of the auto-ambiguity function, d characterizing the distance variable,
   a, b and c denote the coefficients of the parabola modeling the distance cut on a logarithmic scale.

The distance section of the auto-ambiguity function being a maximum at zero distance, the coefficient b is zero.
The width of the lobe of the distance section of the auto-ambiguity function on a logarithmic scale does not depend on the coefficient c (which fixes the value of the auto-ambiguity function at zero distance), but solely on the coefficient a.
The value of the coefficient a can be estimated, on the basis of the reference signal auto-ambiguity function computed in step (19) by the procedure described hereinafter, or any other parabolic approximation algorithm.

Let auto_amb_log(m,n)=20*log 10|auto_amb(m,n)| be the logarithmic modulus of the auto-ambiguity function computed in step (19).

$$a = \frac{\sum_{i=-2}^{2} i^2(\text{auto\_amb\_log}(i, 0) - \text{auto\_amb\_log}(0, 0))}{\sum_{i=-2}^{2} i^4} \quad [46]$$

The auto-correlation of the reference signal on a linear scale being assumed Gaussian, the DSP of the reference signal is also Gaussian. Its 3 dB band can be deduced from a, by:

$$B_{3dB} = \frac{\sqrt{2\ln(2)}}{\pi\sqrt{-10\frac{\log_{10}(e)}{af_{smp}^2}}} \quad [47]$$

where $f_{smp}$ denotes the sampling frequency.
The value $B_{3\,dB}$ of the 3 dB band thus obtained on completion of step 111 is used during step 18 for the computation of $n_{ssechdist}$.

Figure 8:
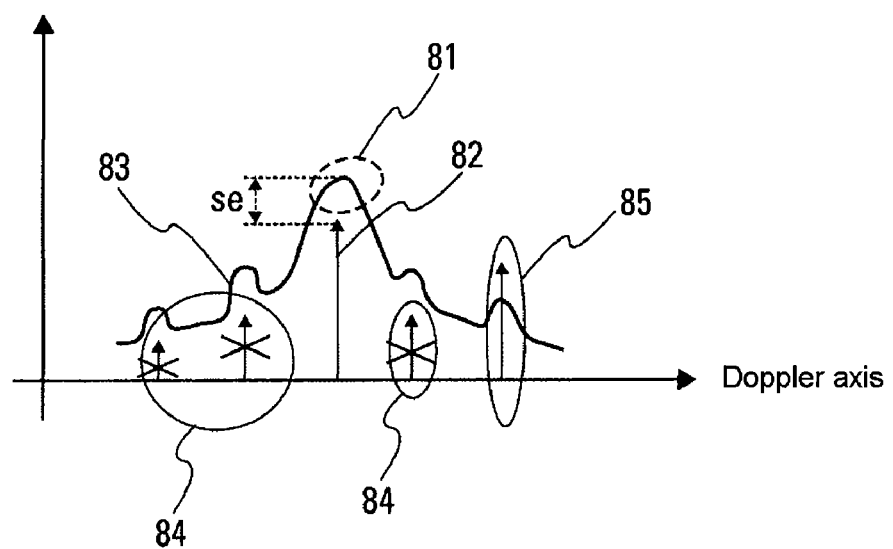

Attention is now turned to FIG. 8 which illustrates the operating principle of the Doppler-distance purification step 112 according to one or more embodiments of the invention.

The object of this step is to eliminate the spurious blips corresponding to the distance/Doppler sidelobes of targets of high level.
Indeed the FM-like reference signal exhibits, distance-wise and Doppler-wise, sidelobes of high level and which are relatively far from the principal lobe. These sidelobes can create, during the Normalization and Detections Search step 17, echo presences (EP) which are not eliminated by the Doppler-distance extraction step 18 which analyses each EP through its near environment.
To carry out this Doppler-distance purification operation, the method according to one or more embodiments of the invention uses the distance-Doppler auto-ambiguity signal of the regenerated signal.

According to one or more embodiments of the invention the extracted blips are ranked in order of decreasing level. The processing then includes translating the autoambiguity function of the reference signal distance-wise and Doppler-wise in such a way that its origin 81 coincides with the distance-Doppler bin of the blip 82 considered. The level of the autoambiguity function is then adjusted on the basis of the level of the processed blip so as to exceed this level by a value called the overshoot threshold. The function thus realized constitutes the purification template 83 used.

Hence all the blips 84—with the exception of the current blip 82 and of the blips situated in its near neighborhood—whose amplitude is below the purification template are considered to originate from Doppler or distance sidelobes and are deleted. The blips such as the blip 85, whose amplitude is above the purification template are, for their part retained.
It should be noted that the illustration of FIG. 8 constitutes a simplified two-dimensional representation in which all the processed blips are situated in the same distance bin. This representation simplified for the sake of clarity nevertheless makes it possible to clearly illustrate the operating principle of the purification step.

On completion of this purification step the remaining blips are used for the subsequent processing steps.

The invention claimed is:

1. A method of processing one or more signals received by an FM passive radar having a plurality of reception pathways, the method comprising the steps of:
   reconditioning the signals received, by use of a coherent process, to produce re-conditioned signals;
   constructing blips by use of a non-coherent process and the re-conditioned signals to form constructed blips; and
   determining attributes associated with the constructed blips,
   wherein the step of reconditioning further comprises the steps of:
      forming cleansed reception pathways;
      regenerating a reference signal, to form a regenerated reference signal;
      computing cross-ambiguities between cleansed target pathways and the regenerated reference signal; and
      computing an auto-ambiguity of the regenerated reference signal.

2. The method as claimed in claim 1, wherein the step of constructing the blips further comprises the steps of:
   extracting a distance-Doppler from the constructed blips, before the step of determining attributes associated with the constructed blips; and
   purifying the Doppler-distance of the constructed blips, after the step of extracting a distance-Doppler, by use of the auto-ambiguity of the regenerated reference signal, to produce purified blips,
wherein the step of determining attributes of the constructed blips is carried out by use of the purified blips.

3. The method as claimed in claim 2, wherein the step of extracting the distance-Doppler further comprises computing a substantially −3 dB band of the regenerated reference signal.

4. The method as claimed in claim 3, wherein the step of computing the substantially −3 dB band of the regenerated reference signal further comprises the step of estimating on the basis of the autoambiguity of the regenerated reference signal.

5. The method as claimed in claim 2, wherein the step of constructing blips further comprises the steps of:
   measuring a distance ecartometry of the purified blips; and
   measuring a azimuthal ecartometry of the purified blips.

6. The method as claimed in claim 5, further comprising the steps of:
   purifying an azimuthal signal; and
   limiting the number of blips sent.

* * * * *